US011904857B2

(12) United States Patent
Kim

(10) Patent No.: US 11,904,857 B2
(45) Date of Patent: Feb. 20, 2024

(54) SYSTEM FOR CONTROLLING A DRIVING SPEED OF A VEHICLE AND A METHOD THEREOF

(71) Applicants: HYUNDAI MOTOR COMPANY, Seoul (KR); KIA CORPORATION, Seoul (KR)

(72) Inventor: Hyun Kyu Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 200 days.

(21) Appl. No.: 17/517,516

(22) Filed: Nov. 2, 2021

(65) Prior Publication Data
US 2022/0388511 A1 Dec. 8, 2022

(30) Foreign Application Priority Data
Jun. 2, 2021 (KR) .................. 10-2021-0071776

(51) Int. Cl.
*B60W 30/14* (2006.01)
*B60W 40/06* (2012.01)
(Continued)

(52) U.S. Cl.
CPC .......... *B60W 30/143* (2013.01); *B60W 40/06* (2013.01); *B60W 40/08* (2013.01); *B60W 40/105* (2013.01); *B60W 50/16* (2013.01); *G06N 20/00* (2019.01); *G06V 20/59* (2022.01); *G06V 40/172* (2022.01);
(Continued)

(58) Field of Classification Search
CPC ..... B60K 31/00; B60K 35/00; B60W 30/025; B60W 30/143; B60W 30/146; B60W 40/06; B60W 40/08; B60W 40/105; B60W 50/14; B60W 50/16; B60W 2040/0809; B60W 2050/0035; B60W 2050/143; B60W 2050/146; B60W 2420/42; B60W 2520/10; B60W 2540/043; B60W 2552/35; B60W 2554/20; B60W 2554/60; B60W 2554/802; B60W 2554/805; B60W 2556/50; B60W 2720/10; B60W 2720/103; G06V 10/30; G06V 20/58; G06V 20/588; G06V 20/59;
(Continued)

(56) References Cited

U.S. PATENT DOCUMENTS 10,692,371 B1 * 6/2020 Nix .................. G08G 1/127
10,821,968 B2 11/2020 Cho et al.
(Continued)

FOREIGN PATENT DOCUMENTS

KR 20140078281 A * 6/2014 ............ F16H 59/36
KR 20190004067 A 1/2019
KR 102042364 B1 11/2019

*Primary Examiner* — Peter D Nolan
*Assistant Examiner* — Ce Li Li
(74) *Attorney, Agent, or Firm* — Lempia Summerfield Katz LLC

(57) ABSTRACT

A vehicle control system may include a controller that obtains route information based on a driving route and a location of a vehicle, searches for an uneven road surface on the driving route based on the route information, calculates an impulse based on vehicle information and shape information about the found uneven road surface when the uneven road surface is found, and sets a target speed based on the calculated impulse and user data.

15 Claims, 12 Drawing Sheets

(51) Int. Cl.
  *B60W 40/08* (2012.01)
  *B60W 40/105* (2012.01)
  *B60W 50/16* (2020.01)
  *G06N 20/00* (2019.01)
  *G06V 20/59* (2022.01)
  *G06V 40/16* (2022.01)
  *B60W 50/14* (2020.01)

(52) U.S. Cl.
  CPC ............... *B60W 2040/0809* (2013.01); *B60W 2050/143* (2013.01); *B60W 2050/146* (2013.01); *B60W 2540/043* (2020.02); *B60W 2540/221* (2020.02); *B60W 2552/35* (2020.02); *B60W 2556/50* (2020.02)

(58) Field of Classification Search
  CPC ... G06V 20/597; G06V 20/625; G06V 40/172
  See application file for complete search history.

(56) References Cited

U.S. PATENT DOCUMENTS

| | | | |
|---|---|---|---|
| 2014/0163837 A1* | 6/2014 | Um | B60W 30/143 701/93 |
| 2019/0001965 A1* | 1/2019 | Cho | B60W 10/06 |
| 2019/0031196 A1* | 1/2019 | Kim | B60W 60/007 |
| 2019/0344634 A1* | 11/2019 | Kim | B60G 17/019 |
| 2020/0346654 A1* | 11/2020 | Kojo | G08G 1/096888 |
| 2020/0361489 A1* | 11/2020 | Park | B60W 50/0097 |
| 2021/0331677 A1* | 10/2021 | Kim | G06N 3/045 |
| 2022/0092319 A1* | 3/2022 | Chun | G06V 10/30 |
| 2022/0204034 A1* | 6/2022 | Stein | B60W 30/095 |

\* cited by examiner

SYSTEM FOR CONTROLLING A DRIVING SPEED OF A VEHICLE AND A METHOD THEREOF

CROSS-REFERENCE TO RELATED APPLICATION

This application claims the benefit of priority to Korean Patent Application No. 10-2021-0071776, filed in the Korean Intellectual Property Office on Jun. 2, 2021, the entire contents of which are incorporated herein by reference.

TECHNICAL FIELD

The present disclosure relates to a technology for controlling a driving speed of a vehicle.

BACKGROUND

When an obstacle such as a speed bump (or an uneven road surface) is found on the road while a vehicle is driven, a driver needs to reduce a speed to reduce impulse. Likewise, for autonomous vehicles, a driver needs to reduce a speed to reduce impulse. For example, a vehicle control system may detect an uneven road surface installed in front by using a sensor and may induce deceleration by notifying a driver of the detected uneven road surface.

SUMMARY

The present disclosure has been made to solve the above-mentioned problems occurring in the prior art while advantages achieved by the prior art are maintained intact.

The impulse generated when a vehicle passes an uneven road surface depends on a vehicle type. Even in the same vehicle model, impacts felt by a passenger vary depending on loading conditions, conditions of tires, and a driving speed at a point in time when the vehicle passes the uneven road surfaces. Furthermore, the tendency to avoid impacts depends on a passenger or the purpose of driving. Accordingly, some people may feel that a specific speed is too slow when a vehicle is driven on an uneven road surface. On the other hand, some people may feel impacts excessively.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, a vehicle control system may include a controller that obtains route information based on a driving route and a location of a vehicle, searches for an uneven road surface on the driving route based on the route information, calculates an impulse based on vehicle information and shape information about the found uneven road surface when the uneven road surface is found, and sets a target speed based on the calculated impulse and user data.

According to an aspect of the present disclosure, a method of a vehicle control system may include: obtaining route information based on a driving route and a location of a vehicle; searching for an uneven road surface on the driving route based on the route information; calculating an impulse based on vehicle information and shape information about the found uneven road surface when the uneven road surface is found; and setting a target speed based on the calculated impulse and user data.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
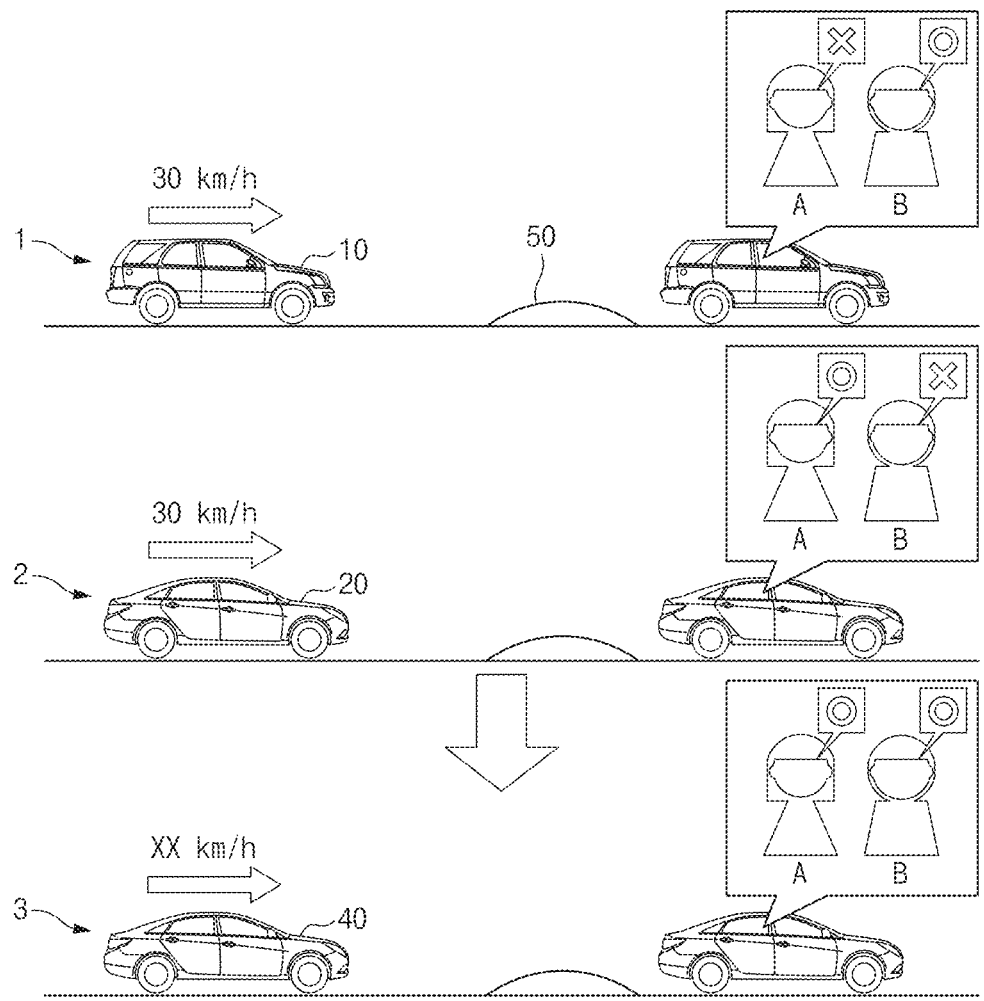
FIG. 1 illustrates user satisfaction when a vehicle passes an uneven road surface, according to various embodiments.

Hereinafter, various embodiments of the present disclosure are described with reference to accompanying drawings. However, it should be understood that this is not intended to limit the present disclosure to specific implementation forms and includes various modifications, equivalents, and/or alternatives of embodiments of the present disclosure.

Various embodiments of the present disclosure and terms used herein are not intended to limit the technical features described in the present disclosure to specific embodiments. It should be understood that the embodiments and the terms include modification, equivalent, or alternative of the corresponding embodiments described herein. With regard to description of drawings, similar or related components may be marked by similar reference marks/numerals. The singular form of the noun corresponding to an item may include one or more of items, unless interpreted otherwise in context. In the present disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component)

is referred to as being "coupled with/to" or "connected to" another component (e.g., a second component) with or without the term of "operatively" or "communicatively", it may mean that a component is connectable to the other component, directly (e.g., by wire), wirelessly, or through a third component.

In various embodiments of the present disclosure, the term "module" used herein may include a unit, which is implemented with hardware, software, or firmware, and may be interchangeably used with the terms "logic", "logical block", "part", or "circuit". The "module" may be a minimum unit of an integrated part or may be a minimum unit of the part for performing one or more functions or a part thereof. For example, according to an embodiment, the module may be implemented in the form of an application-specific integrated circuit (ASIC).

Various embodiments of the present disclosure may be implemented with software (e.g., a program) including one or more instructions stored in a storage medium (e.g., an internal memory or an external memory) readable by a machine. For example, a machine may call at least one instruction of the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves). This term does not distinguish between the case where data is semi-permanently stored in the storage medium and the case where the data is stored temporarily.

According to an embodiment, a method according to various embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store, directly between two user devices, or online. In the case of on-line distribution, at least part of the computer program product may be at least temporarily stored in the machine-readable storage medium such as the memory of a manufacturer's server, an application store's server, or a relay server or may be generated temporarily.

According to various embodiments, each component (e.g., a module or a program) of the above-described components may include a single entity or a plurality of entities and some of the plurality of objects may be separately arranged on other components. According to various embodiments, one or more the components of the above-described components or operations may be omitted, or one or more other components or operations may be added. Alternatively, or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to various embodiments, operations executed by modules, programs, or other components may be executed by a successive method, a parallel method, a repeated method, or a heuristic method. Alternatively, at least one or more of the operations may be executed in another order or may be omitted, or one or more operations may be added. When a component, device, element, or the like of the present disclosure is described as having a purpose or performing an operation, function, or the like, the component, device, or element should be considered herein as being "configured to" meet that purpose or to perform that operation or function.

FIG. 1 illustrates user satisfaction when a vehicle passes an uneven road surface, according to various embodiments.

Referring to FIG. 1, even when a speed of a vehicle that passes an uneven road surface 50 located on a road is the same as another vehicle, the satisfaction at a point in time when the vehicle passes the uneven road surface 50 may depend on the type of the vehicle or the tendency of a passenger. For example, when a first vehicle 10 passes the uneven road surface 50 at a speed of 30 km/h, passenger A may feel uncomfortable due to the impact, but passenger B may not feel uncomfortable. On the other hand, when a first vehicle 20 passes the uneven road surface 50 at a speed of 30 km/h, passenger A may not feel uncomfortable, but passenger B may feel uncomfortable. In addition, even when the same vehicle passes the uneven road surface 50 at the same speed, the impulse felt by a passenger may be different depending on the shape of the uneven road surface 50 or the loading condition of a vehicle. Furthermore, even when the impulse at a point in time when a vehicle passes an uneven road surface at a specific speed is not large, some passengers may feel uncomfortable because the speed of the vehicle is too slow.

The vehicle control system installed in a vehicle 40 may set a target speed to ensure the riding comfort of passengers A and B by minimizing an impulse based on user data such as vehicle information, shape information of the uneven road surface 50, and sensitivity of a passenger.

Figure 2:
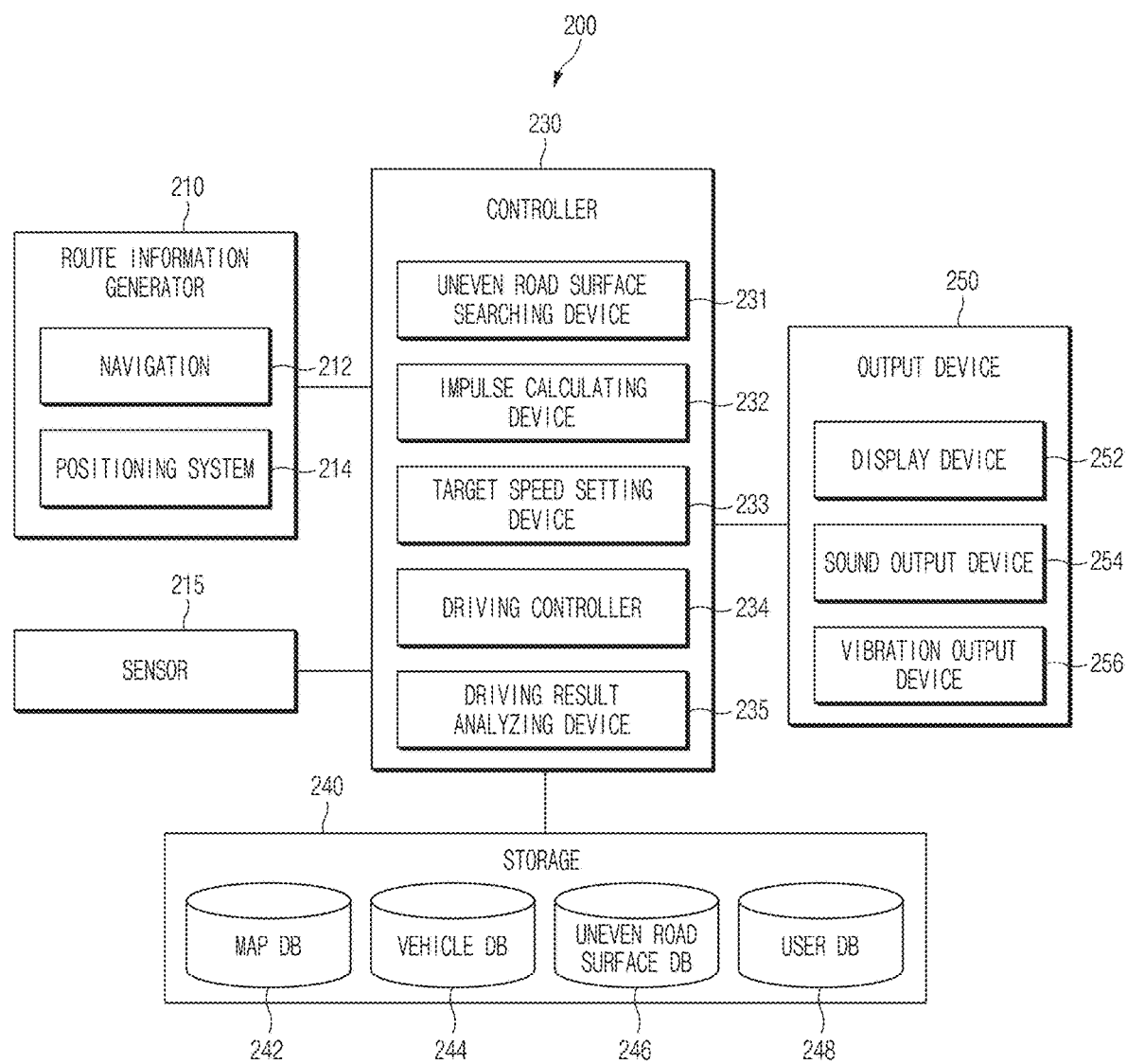
FIG. 2 illustrates a block diagram of a vehicle control system, according to various embodiments.

FIG. 2 illustrates a block diagram of a vehicle control system, according to various embodiments.

Referring to FIG. 2, a vehicle control system 200 may include a route information generator 210, a sensor 215, a controller 230, and an output device 250. In an embodiment, storage 240 may be installed in a form of a memory inside a vehicle or may be present as a separate data server outside the vehicle. When the storage 240 is present as a data server, the vehicle control system 200 may obtain information from the data server by using a communication circuit (not shown). In addition to the configurations shown in FIG. 2, the vehicle control system 200 may further include a configuration (e.g., steering, a driving part, a brake, a headlamp, and a gear) for driving a vehicle.

The route information generator 210 may generate route information of a vehicle. For example, the route information may include at least one of a current location of a vehicle, a driving route to a destination, or information about an uneven road surface located on a driving route or a driving peripheral route. For example, the route information generator 210 may include navigation 212 configured to generate a driving route and a positioning system 214 configured to measure a current location of a vehicle. The navigation 212 may obtain map information about the periphery of a driving route from a map database (DB) 242. The positioning system 214 may measure the current location of the vehicle by using a system such as a global positioning system (GPS), but is not limited thereto.

The sensor 215 may include at least one sensor capable of measuring information about the inside or outside of the vehicle. For example, the sensor 215 may include at least one sensor capable of detecting an external object of a vehicle, such as a camera, radar, or lidar. In this case, the sensor 215 may detect an uneven road surface or may measure the shape (e.g., a height, a width, or an angle) of the detected uneven road surface. As another example, the sensor 215 may recognize a passenger's face by using a camera. As another example, to calculate the vehicle's loading weight, the vehicle's driving condition, or an impulse at a point in time when the vehicle passes an uneven road surface, the sensor 215 may include at least one of a displacement sensor, an acceleration sensor, a gyro sensor, a wheel speed sensor, or a jerk sensor.

The output device 250 may provide data processed by the controller 230 to a user through visual, auditory, or tactile sense. For example, the output device 250 may include at least one of a display device 252, a sound output device 254, or a vibration output device 256. Although not shown in FIG. 2, the vehicle control system 200 may further include an input device capable of receiving a user input. For example, the vehicle control system 200 may include at least one of a microphone configured to receive a user's voice input, a physical button, or a soft button that is displayed on the display device 252 in a form of a graphic user interface (GUI).

The controller 230 may be a control device for controlling configurations in a vehicle. For example, the controller 230 may be referred to as a "processor" or an "electronic control unit (ECU)". As another example, the controller 230 may be a program or application that is stored in a form of instructions in a memory (e.g., the storage 240) to control the configurations in a vehicle. To perform overall functions of the vehicle control system 200, the controller 230 may be connected to the route information generator 210, the sensor 215, the output device 250, and the storage 240 (or a communication circuit). For example, the controller 230 may be connected to other configurations through a controller area network (CAN) protocol. The configurations included in the controller 230 may be software (e.g., a program) as well as a hardware configuration.

An uneven road surface searching device 231 may search for an uneven road surface on a driving route based on route information obtained from the route information generator 210 and information obtained from an uneven road surface DB 246. For example, the uneven road surface searching device 231 may identify information about the location and shape of the uneven road surface. According to another embodiment, the uneven road surface searching device 231 may identify information about the location and shape of the uneven road surface by using a sensor such as a camera, radar, or lidar.

An impulse calculating device 232 may calculate the impulse according to a driving speed based on vehicle information and information about the found uneven road surface. The vehicle information may include a vehicle dynamic model. In addition, the vehicle information may include vehicle state information such as a loading weight or a vehicle driving state. For example, the impulse calculating device 232 may obtain vehicle information by using the vehicle the sensor 215 or a vehicle DB 244.

A target speed setting device 233 may determine a target speed suitable for a passenger based on the calculated impulse and user data stored in a user DB 248. The target speed may refer to a driving speed at which a passenger's discomfort is minimized when a vehicle passes an uneven road surface. In an embodiment, the target speed setting device 233 may determine a reference speed according to a current driving state based on the set target speed and a distance to an uneven road surface. Thus, a vehicle is capable of being decelerated slowly without sudden braking at a point in time when the vehicle arrives on the uneven road surface.

A driving controller 234 may control the driving of a vehicle depending on a reference speed and a target speed set by the target speed setting device 233. In an embodiment, for a manual driving mode in which the driving speed of a vehicle is determined by a driver, the operation of the driving controller 234 may be omitted.

After a vehicle passes an uneven road surface, a driving result analyzing device 235 may analyze a user feedback according to impulse. For example, the driving result analyzing device 235 may generate a feedback by identifying a user state (e.g., facial recognition results or biometric data) at a point in time when a vehicle passes an uneven road surface, or by receiving a response after a survey is provided to a user. The driving result analyzing device 235 may update the user data by storing the generated feedback in the user DB 248.

The controller 230 may notify a user of the target speed or the reference speed by using at least one of a display device, a sound output device, or a vibration output device.

Figure 3:
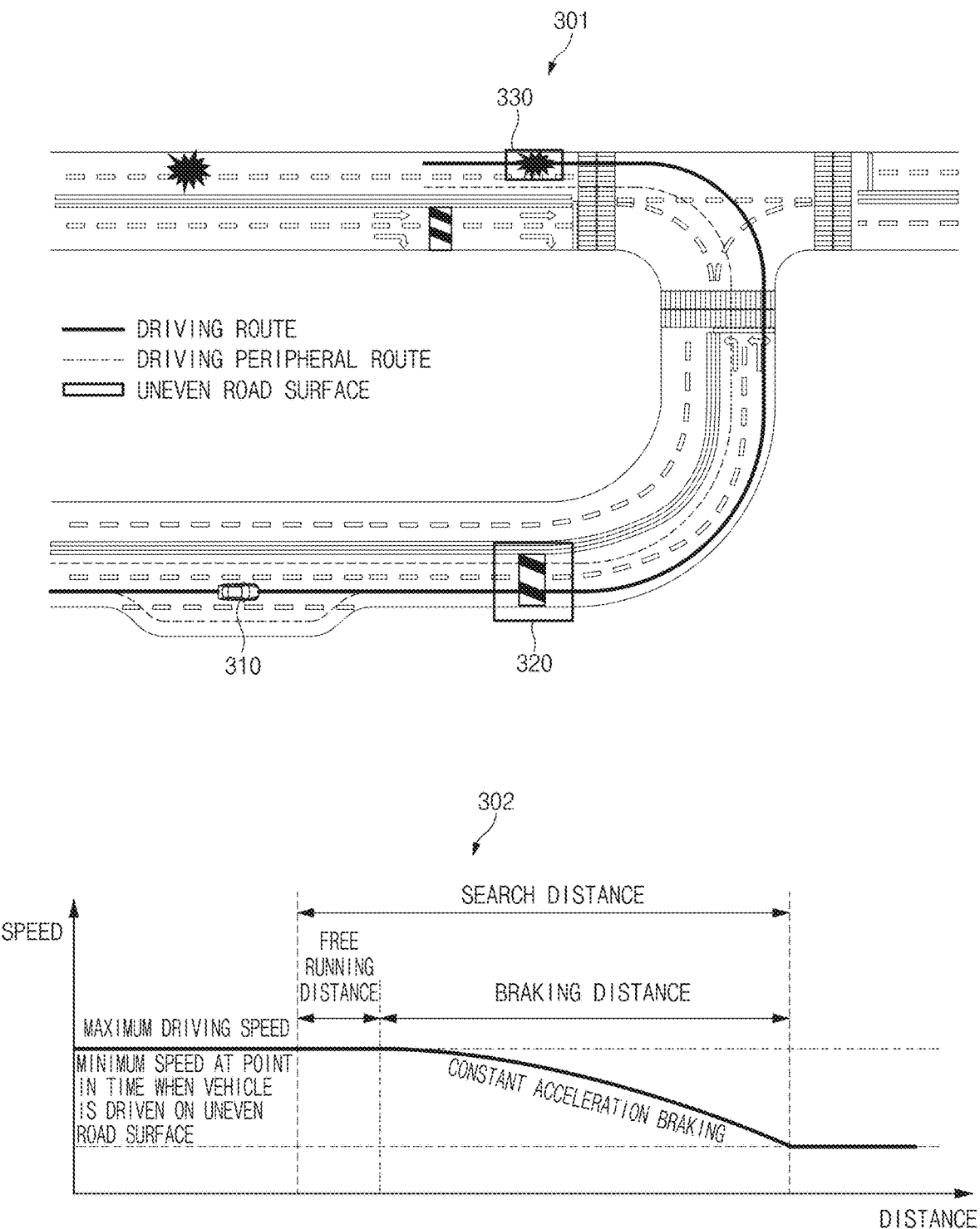
FIG. 3 illustrates an operation of searching for an uneven road surface, according to various embodiments.

FIG. 3 illustrates an operation of searching for an uneven road surface, according to various embodiments.

Referring to reference number 301 of FIG. 3, the uneven road surface searching device 231 may search for an uneven road surface (e.g., 320 or 330) on a driving route or a driving peripheral route of a vehicle 310 by using route information obtained from the route information generator 210. When the uneven road surface is detected on the driving route, the uneven road surface searching device 231 may transmit information about the location and shape of the found uneven road surface to the impulse calculating device 232 such that the impulse is calculated.

The calculating of the impulse and a target speed for all uneven road surfaces located on a driving route from a current location of the vehicle to a destination may increase the load of the vehicle control system 200. On the other hand, when the vehicle 310 approaches the uneven road surface, sudden braking may occur due to the reaction speed or the calculation processing time when the impulse and the target speed are calculated. Accordingly, the uneven road surface searching device 231 may search for an uneven road surface on a driving route or a driving peripheral route based on whether an uneven road surface is present within a search distance. For example, the search distance $D_{search}$ may be calculated depending on a graph 302 and Equation 1 below.

$$D_{search} = \frac{(v_{init}^2 - v_{final}^2)}{2a_{init}} + D_{margin} \qquad \text{[Equation 1]}$$

In the graph 302, a search distance may be "free running distance+braking distance". In Equation 1, $a_{init}$ may denote acceleration for braking within a range in which a passenger does not feel uncomfortable; $v^2_{init}$ may denote the maximum driving speed; $v^2_{final}$ may denote the minimum speed at a point in time when a vehicle is driven on an uneven road surface; and, $D_{margin}$ may denote a margin distance.

Figure 4:
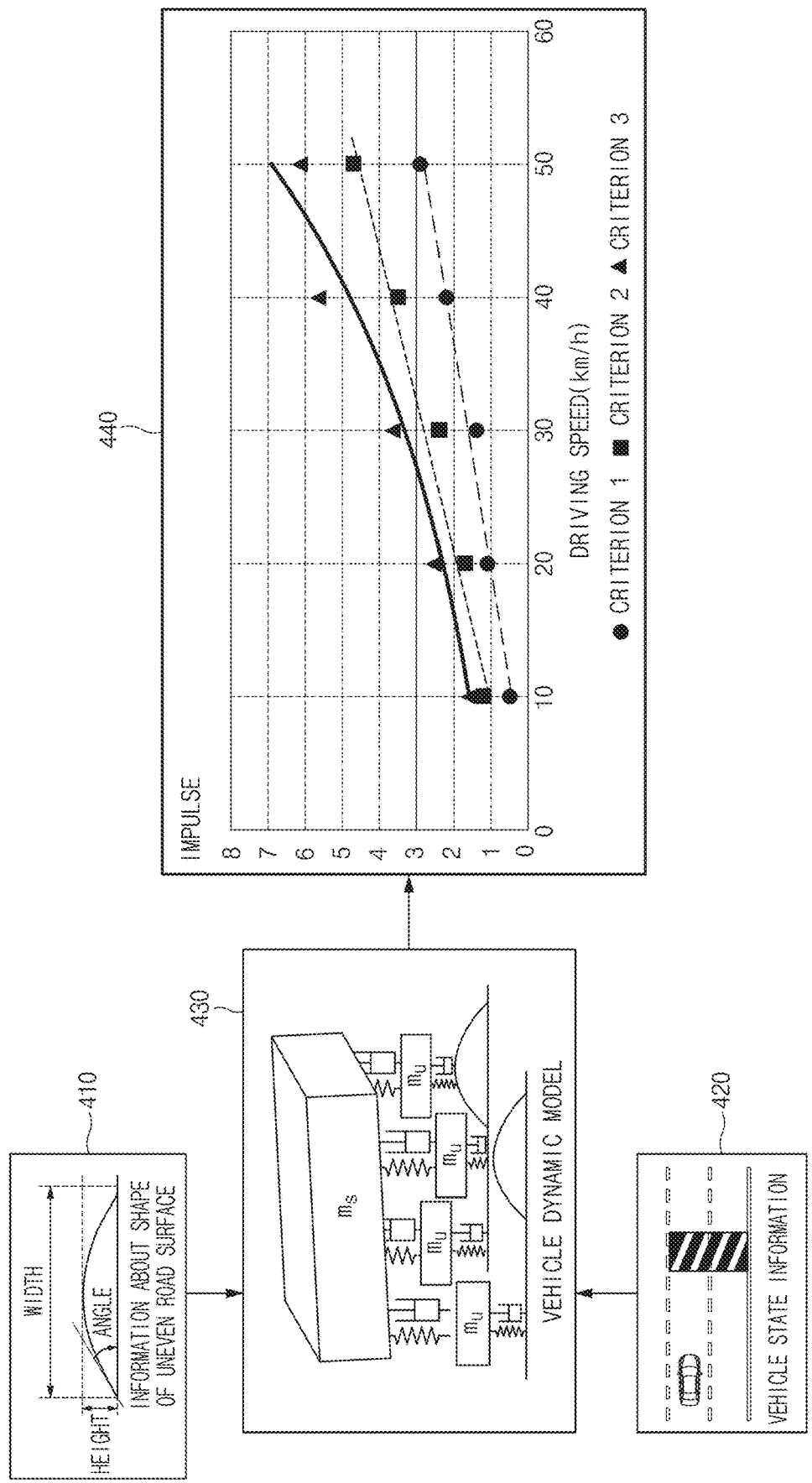
FIG. 4 illustrates an operation of calculating impulse, according to various embodiments.

FIG. 4 illustrates an operation of calculating impulse, according to various embodiments.

Referring to FIG. 4, the impulse calculating device 232 may calculate impulse, which is delivered to a passenger when a vehicle passes an uneven road surface, by using shape information 410 such as the width, height, or angle of the uneven road surface and a vehicle dynamic model 430 of the vehicle. In an embodiment, the impulse device 232 may further consider vehicle state information 420. The vehicle state information 420 may include at least one of a loading condition or a driving state of the vehicle. The impulse calculating device 232 may convert the impulse delivered through tires in a vertical direction of a road surface into a physical quantity when the vehicle passes the uneven road surface, by inputting the shape information 410 and the vehicle state information 420 to the vehicle dynamic model 430 as parameters. The parameter may include acceleration, a speed, or a pitch angle.

The impulse calculating device 232 may calculate the impulse depending on a driving speed. For example, a horizontal axis of a graph 440 may indicate a driving speed. A vertical axis may indicate impulse. The impulse may be expressed differently depending on criteria (1 to 3). The criterion may be, for example, at least one of a maximum value of acceleration, an average value of the acceleration, or duration. The impulse depends on the vehicle's driving speed and the driving speed at a point in time when the vehicle passes the uneven road surface has not yet been determined. Accordingly, the impulse calculating device 232 may predict the impulse according to the driving speed within a specified range. The driving speed may be a continuous value and the calculating of the impulse according to all driving speeds may increase a load. Accordingly, the impulse calculating device 232 may calculate the impulse by using a regression analysis model in which continuous values are simplified as shown in the graph 440. The range of a driving speed to be applied to the regression analysis model may be determined depending on the maximum, minimum, and change rate of shape information and existing driving data of the vehicle. For example, the impulse calculating device 232 may extract an arbitrary point, may apply a least square method to a value corresponding to the extracted point, and may convert the continuous values to a regression analysis model. The distribution or number of points may be determined in consideration of the load of calculation or the nonlinearity of a result. The impulse calculating device 232 may be configured such that the degree of a polynomial may be linked to the number of points. As compared to the number of points, the degree of the polynomial may not be increased such that overfitting does not occur.

Figure 5:
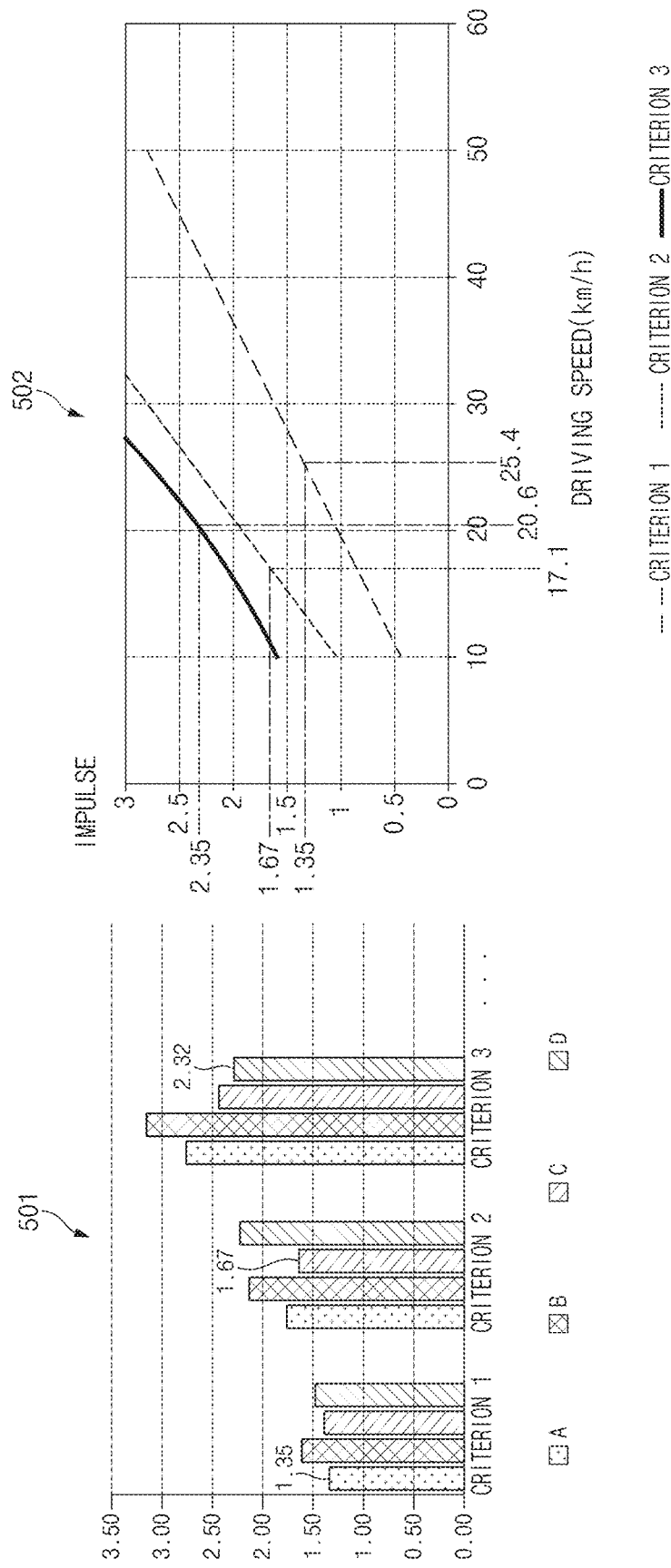
FIG. 5 illustrates an operation of setting a target speed, according to various embodiments.

FIG. 5 illustrates an operation of setting a target speed, according to various embodiments.

The target speed setting device 233 may set a target speed based on a calculated impulse and user data. The user data may indicate the maximum impulse (e.g., sensitivity) that is acceptable by a passenger at a specific criterion (e.g., at least one of an acceleration maximum, an acceleration average, a duration, a noise in a vehicle, shape information of an uneven road surface, vehicle state information, or the impulse calculated by the impulse calculating device 232) for each passenger. The target speed setting device 233 may quantify a passenger's sensitivity for impacts by selecting one or more parameters indicating specific criteria in consideration of a computation time and the complexity of a database. The target speed setting device 233 may set a minimum value for sensitivity for each criterion and then may set a target speed such that the sensitivity does not exceed a minimum value. However, a result that a vehicle is stopped or is reversed may occur when a driving speed is too low. Accordingly, the target speed setting device 233 may detect a detour road when the target speed is less than a threshold value. When there is a plurality of passengers, the maximum impulse (i.e., sensitivity) acceptable for each passenger may be different. Accordingly, the target speed setting device 233 may set the target speed based on the minimum value among a plurality of sensitivities.

For example, referring to FIG. 5, the target speed setting device 233 may refer to user data 501 indicating the sensitivity for each passenger (A, B, C, D) according to a plurality of criteria (1, 2, 3). The target speed setting device 233 may select a value (e.g., 1.35 at criterion 1, 1.67 at criterion 2, and 2.32 at criterion 3) having the minimum sensitivity for each criterion such that all passengers do not feel uncomfortable. The target speed setting device 233 may set a target speed (e.g., 25.4 km/h at criterion 1, 17.1 km/h at criterion 2, and 20.6 km/h at criterion 3) corresponding to the selected sensitivity with reference to data indicating the relationship between the sensitivity and the target speed as illustrated in a graph 502. The data indicating the relationship between the sensitivity and the target speed may be stored as a graph or a look-up table.

Figure 6:
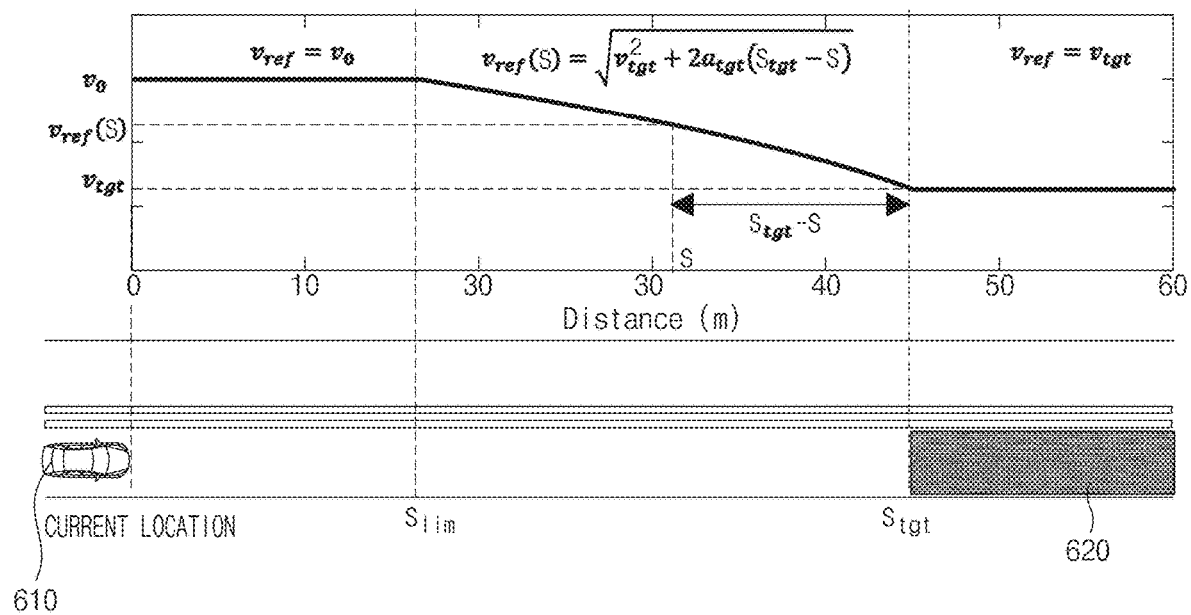
FIG. 6 illustrates an operation of setting a reference speed, according to various embodiments.

FIG. 6 illustrates an operation of setting a reference speed, according to various embodiments.

Sudden braking may occur when a vehicle 610 is driving fast and then is decelerated to a target speed near an uneven road surface 620. Accordingly, the driving controller 234 may determine a reference speed such that the vehicle 610 is capable of being decelerated with a constant acceleration. For example, the target speed setting device 233 may calculate the reference speed $v_{ref}(s)$ according to a current location (s) of the vehicle 610 through Equation 2 below.

$$v_{ref}(s) = \begin{pmatrix} v_0(s < s_{lim}) \\ \sqrt{v_{tgt}^2 + 2a_{tgt}(s_{tgt} - s)}\,(s_{lim} < s < s_{tgt}) \\ v_{tgt}(s > s_{tgt}) \end{pmatrix} \quad \text{[Equation 2]}$$

In Equation 2, $s_{lim}$ may denote a start location of a speed limit for constant acceleration motion; $s_{tgt}$ may denote a location at which a vehicle is decelerated to a target speed $v_{tgt}$; and, $a_{tgt}$ may denote an acceleration value.

The driving controller 234 may control the vehicle 610 such that the driving speed of the vehicle 610 does not exceed a reference speed; alternatively, the driving controller 234 may guide a driver to the reference speed in a manual driving mode.

Figure 7:
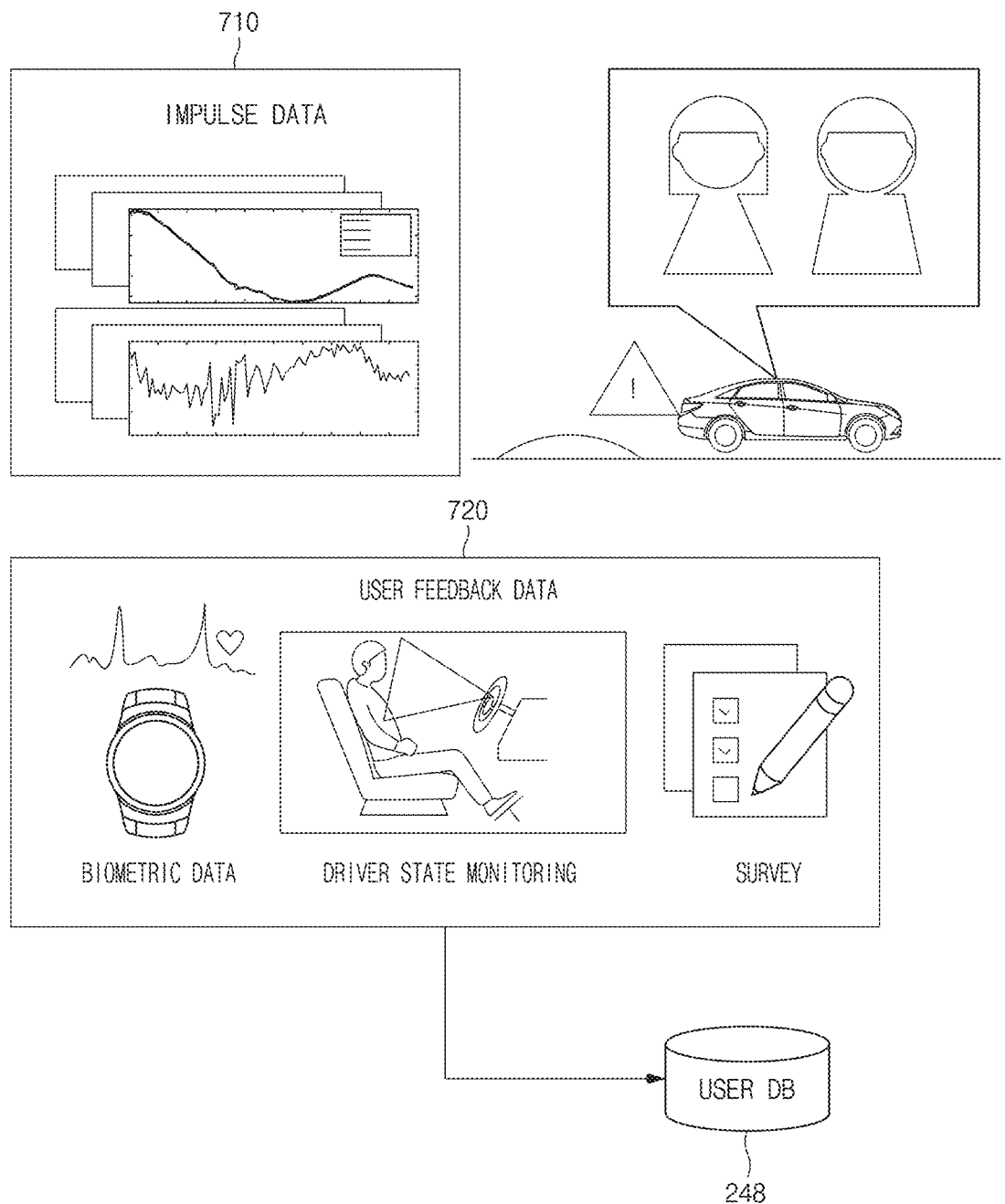
FIG. 7 illustrates an operation of updating user data, according to various embodiments.

FIG. 7 illustrates an operation of updating user data, according to various embodiments.

Referring to FIG. 7, the driving result analyzing device 235 may update user data stored in the user DB 248 in impulse data 710 obtained when a vehicle passes an uneven road surface, based on user feedback data 720 corresponding to the impulse data 710. For example, the impulse data 710 may be a value calculated by the impulse calculating device 232. In addition, the driving result analyzing device 235 may obtain the impulse data 710 through the sensor 215. For example, the driving result analyzing device 235 may measure the shape of a road surface by using lidar or may measure an impulse through a displacement sensor mounted on a suspension, an acceleration sensor of the vehicle, a jerk sensor, or a wheel speed sensor. As another example, the driving result analyzing device 235 may obtain the impulse data 710 by using an impact sound obtained through a microphone or the degree of movement of an object in an image captured by a camera. The user feedback data 720 may include at least one of biometric data, a face recognition result, or a survey result of a passenger. The biometric data may include a heart rate or a biometric signal, which is measured by the passenger's personal device (e.g., a smartphone or a wearable device). The facial recognition result may include the passenger's eye movement or expression. The driving result analyzing device 235 may conduct a survey by providing GUI or voice to a passenger through the output device 250. The survey may include the passenger's gender, age, driving experience, or the like.

The driving result analyzing device 235 may increase the target speed calculation accuracy of the target speed setting device 233, by updating the user feedback data 720 according to the impulse data 710 in the user DB 248.

Figure 8:
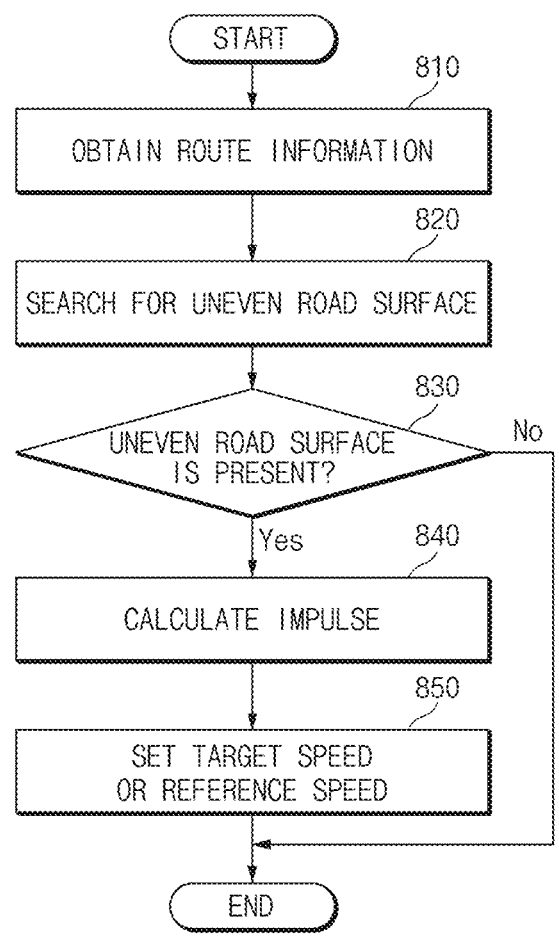
FIG. 8 is a flowchart illustrating an operation of setting a target speed or a reference speed, according to various embodiments.

FIG. 8 is a flowchart illustrating an operation of setting a target speed or a reference speed, according to various embodiments. Operations of an operation flowchart shown below may be implemented by the vehicle control system 200 or may be implemented by configurations (e.g., the controller 230) included in the vehicle control system 200.

Referring to FIG. 8, in operation 810, the vehicle control system 200 may obtain route information based on a driving route and a location of a vehicle.

In operation 820, the vehicle control system 200 may search for an uneven road surface on a driving route based on the obtained route information.

In operation 830, the vehicle control system 200 may determine whether an uneven road surface is present. For example, the vehicle control system 200 may calculate a search distance based on the vehicle's maximum driving speed, a minimum speed at which the vehicle passes an uneven road surface, and a margin distance. Then, the vehicle control system 200 may determine whether the uneven road surface is present within the search distance. When there is no uneven road surface within the search distance, the vehicle control system 200 may end an algorithm.

When an uneven road surface is present, in operation 840, the vehicle control system 200 may calculate an impulse based on vehicle information and shape information about the uneven road surface. For example, the vehicle control system 200 may predict the impulse according to a driving speed by inputting the shape information of the uneven road surface as a parameter to a vehicle dynamic model.

In operation 850, the vehicle control system 200 may set a target speed or a reference speed based on the calculated impulse. The target speed may be determined as a driving speed capable of satisfying a minimum impulse at which a passenger does not feel uncomfortable. The vehicle control system 200 may determine the target speed based on the impulse calculated in operation 840 and the user data stored in the user DB. The vehicle control system 200 may set a reference speed such that the vehicle is decelerated with a constant acceleration in consideration of a distance from a current location of the vehicle to an uneven road surface. The vehicle control system 200 may control the speed of a vehicle such that the speed of the vehicle does not exceed the reference speed.

Figure 9:
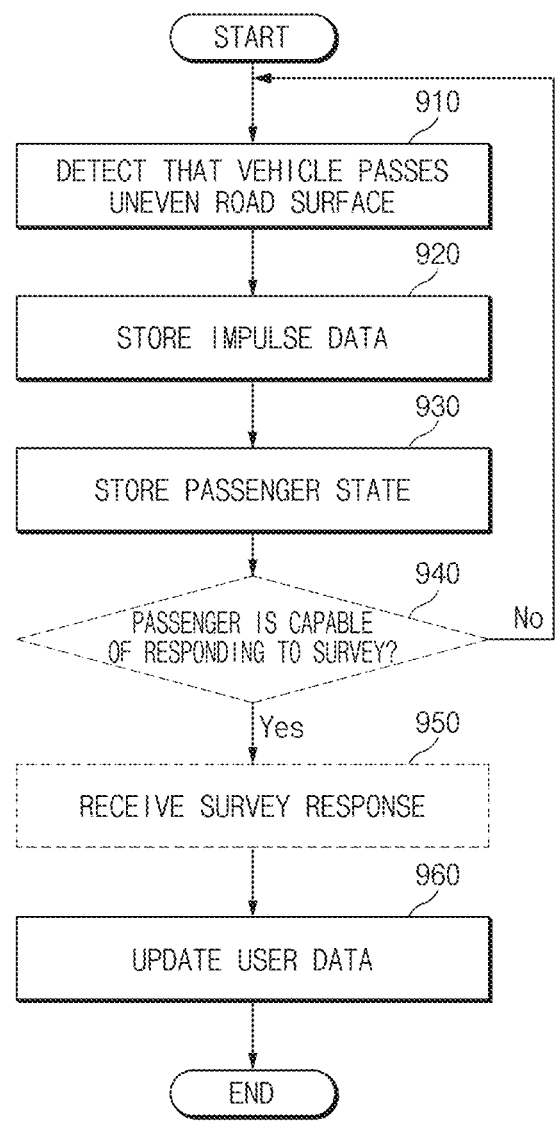
FIG. 9 is a flowchart illustrating an operation of updating user data, according to various embodiments.

FIG. 9 is a flowchart illustrating an operation of updating user data, according to various embodiments.

Referring to FIG. 9, in operation 910, the vehicle control system 200 may detect that a vehicle passes an uneven road surface.

In operation 920, the vehicle control system 200 may store impulse data. The impulse data may be based on a noise or an image as well as a parameter for dynamics in a vertical direction.

In operation 930, the vehicle control system 200 may store a passenger state. For example, the passenger state may indicate biometric data of a passenger or a face recognition result of the passenger.

In operation 940, the vehicle control system 200 may ask whether a passenger is capable of responding to a survey. When the passenger is incapable of responding to the survey, the vehicle control system 200 may attempt to detect the passage of the next uneven road surface.

When the passenger is capable of responding to the survey, in operation 950, the vehicle control system 200 may receive a survey response. In an embodiment, the vehicle control system 200 may omit operation 940 and operation 950.

In operation 960, the vehicle control system 200 may update user data based on the stored impulse data, a passenger state, and the survey response.

Figure 10:
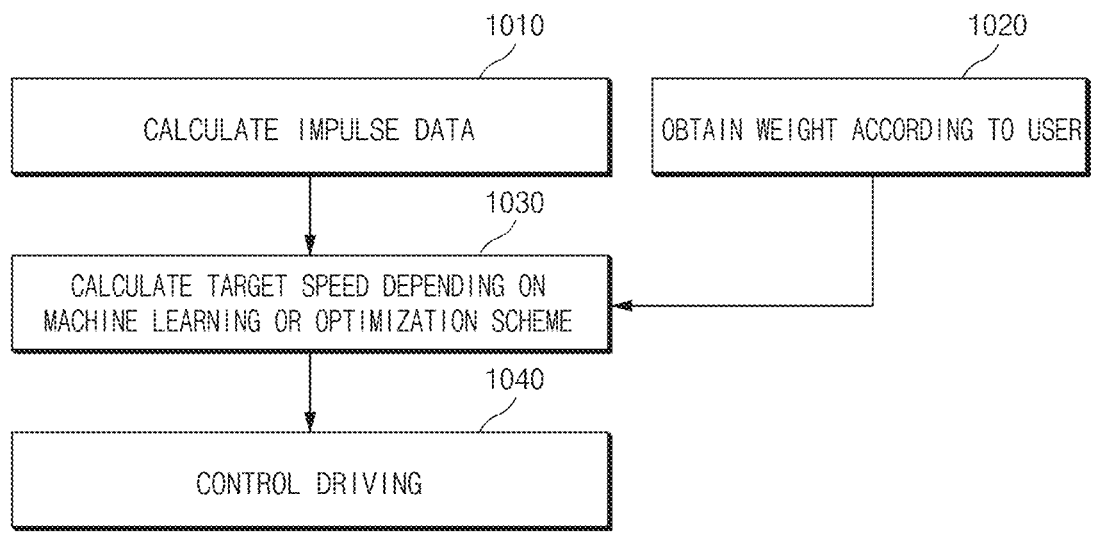
FIG. 10 is a flowchart illustrating an operation of calculating a target speed by using machine learning or an optimization scheme, according to various embodiments of the present disclosure.

FIG. 10 is a flowchart illustrating an operation of calculating a target speed by using machine learning or an optimization scheme, according to various embodiments of the present disclosure.

The vehicle control system 200 needs to provide a passenger with both the riding comfort and driving feeling, by keeping a driving speed to be fast while minimizing impacts to the passenger at a point in time when a vehicle passes an uneven road surface found on a driving route. To this end, the vehicle control system 200 may obtain a weight for the passenger's discomfort and the passenger's satisfaction with the driving speed and may apply a weight when calculating a target speed. Accordingly, the vehicle control system 200 may calculate a speed optimized for a user. Furthermore, the calculating of a weight according to a user or the calculating of a target speed by applying a weight may require a considerable amount of computation. Thus, the vehicle control system 200 may increase a search distance or may calculate a target speed through results of machine learning or an optimization scheme of an external server.

Referring to FIG. 10, in operation 1010, the vehicle control system 200 may calculate an impulse. For example, the vehicle control system 200 may calculate an impulse based on vehicle information and shape information about the found uneven road surface.

In operation 1020, the vehicle control system 200 may obtain a weight according to a user. For example, the weight may be based on the user's discomfort with a specific criterion or a specific target speed and the satisfaction with the driving speed.

In operation 1030, the vehicle control system 200 may calculate the target speed depending on the obtained weight and machine learning or an optimization scheme.

In operation 1040, the vehicle control system 200 may control driving by using the calculated target speed.

Figure 11:
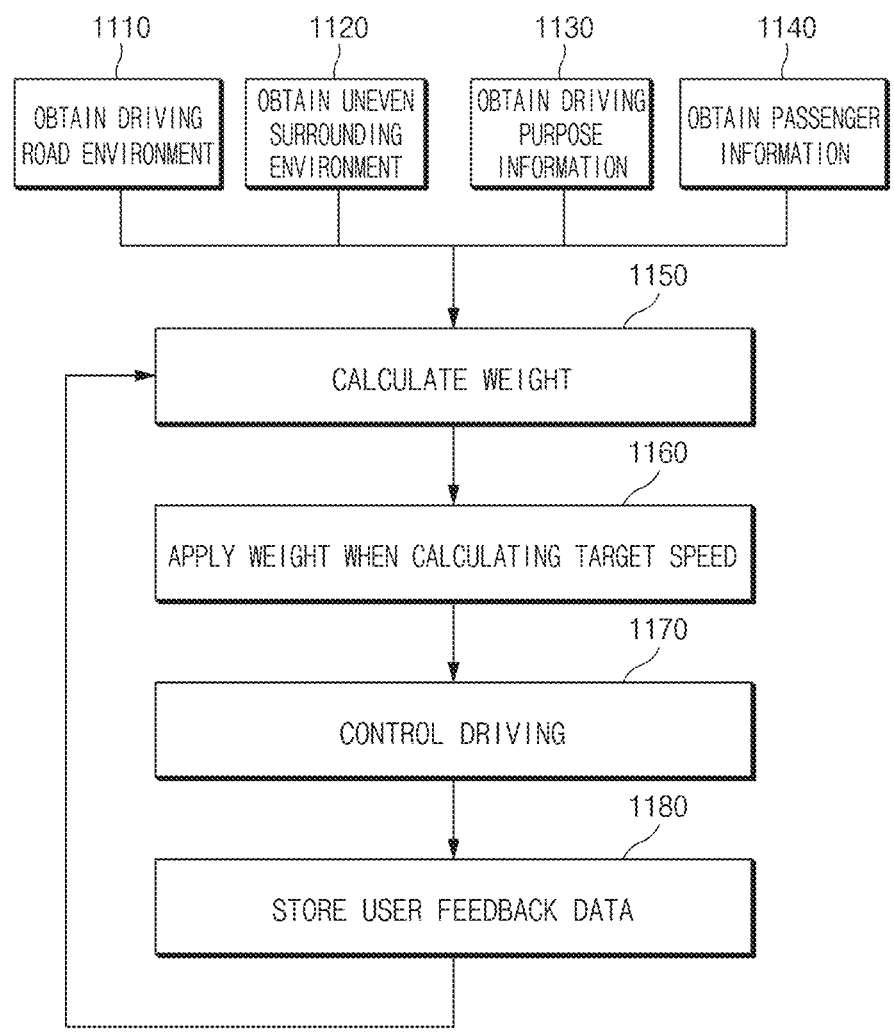
FIG. 11 is a flowchart illustrating an operation of calculating a target speed by applying a weight in accordance with various situations, according to various embodiments.

FIG. 11 is a flowchart illustrating an operation of calculating a target speed by applying a weight in accordance with various situations, according to various embodiments.

A passenger subjectively feels impacts and thus the impacts felt by the passenger may be affected depending on not only physical situations but also subjective driving situations. For example, the degree of impacts felt by the passenger may be different depending on whether the passenger perceives an uneven road surface or driving road environments, such as weather, time zone, season, curvature of a driving route, driving conditions at night, or visibility. In addition, a driver becomes sensitive or insensitive to impacts depending on whether a passenger is present, a position of the passenger, or a relationship with the passenger. For example, when there is no passenger, the driver may be insensitive to impacts. On the other hand, when there is a passenger who needs consideration, the driver may be sensitive to impacts. Also, the sensitivity to impacts may depend on a driving purpose or driving distance. For example, when the riding state is maintained for a long time, the driver or a passenger becomes sensitive to impacts. On the other hand, when the driver drives a vehicle for leisure, the driver or passenger may become insensitive to impacts. The vehicle control system 200 may apply a weight when calculating the target speed, by receiving the above-described situations from a user before a vehicle starts driving, or by detecting road environments or uneven surrounding environments while the vehicle is driven.

Referring to FIG. 11, the vehicle control system 200 may obtain a driving road environment (operation 1110), may obtain an uneven surrounding environment (operation 1120), may obtain driving purpose information (operation 1130), or may obtain passenger information (operation 1140).

In operation 1150, the vehicle control system 200 may calculate a weight based on the obtained information.

In operation 1160, the vehicle control system 200 may apply the weight calculated when calculating the target speed.

In operation 1170, the vehicle control system 200 may control the driving of the vehicle based on the calculated target speed.

In operation 1180, the vehicle control system 200 may store user feedback data according to driving. The vehicle control system 200 may update the weight by using the stored user feedback data.

Figure 12:
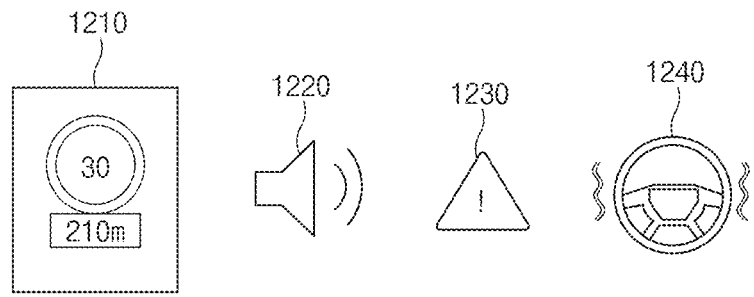
FIG. 12 illustrates a user interface for guiding a driving speed, according to various embodiments.

FIG. 12 illustrates a user interface for guiding a driving speed, according to various embodiments.

When a new passenger boards a vehicle, there is no user data for the passenger. Accordingly, the prediction of the vehicle control system 200 may fail. Moreover, when a driver is driving manually, the passenger may feel great impacts when the vehicle passes an uneven road surface while the driver does not perceive a target speed. To the end, the vehicle control system 200 may provide a user interface for guiding the driver's driving speed depending on the calculated target speed or the calculated reference speed. For example, the vehicle control system 200 may output information indicating the reference speed (e.g., 30 km/h) or a distance (e.g., 210 m) to the uneven road surface to a GUI 1210 through the display device 252 or may output a voice 1220 through the sound output device 254. As another example, the vehicle control system 200 may output a warning light 1230 or a warning sound to notify the driver of the proximity to the uneven road surface or may output vibration through the vibration output device 256 mounted on a steering wheel.

According to various embodiments disclosed in this specification, a vehicle control system may maintain an appropriate speed while minimizing discomfort caused by impacts by using a calculated impulse and user data.

According to various embodiments disclosed in this specification, the vehicle control system may set an optimized driving speed by reflecting the shape of an uneven road surface or the condition of a vehicle.

According to various embodiments disclosed in this specification, the vehicle control system may increase the accuracy of a target speed setting according to a passenger and vehicle information by analyzing and updating driving results.

Besides, a variety of effects directly or indirectly understood through the specification may be provided.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. A vehicle control system comprising a controller configured to:
   obtain route information based on a driving route and a location of a vehicle;
   search for an uneven road surface on the driving route based on the route information;
   calculate an impulse based on vehicle information and shape information about a found uneven road surface when the uneven road surface is found;
   set a target speed based on the calculated impulse and user data;
   control a speed of the vehicle based on the target speed;
   obtain user feedback data by obtaining biometric data of a passenger or a face recognition result of the passenger at a point in time when the vehicle passes the uneven road surface or receiving a response of the passenger to a survey corresponding to data for the uneven road surface; and
   update the user data based on the user feedback data corresponding to impulse data for the uneven road surface.

2. The vehicle control system of claim 1, wherein the controller is configured to:
   calculate a search distance based on a maximum driving speed of the vehicle, a minimum speed at a point in time when the vehicle passes the uneven road surface, and a margin distance; and
   search for the uneven road surface based on whether the uneven road surface is present within the search distance.

3. The vehicle control system of claim 1, wherein the controller is configured to:
   calculate the impulse based on a vehicle dynamic model and vehicle state information, which are included in the vehicle information, and the shape information about the found uneven road surface.

4. The vehicle control system of claim 1, wherein the controller is configured to:
   set the target speed that minimizes the impulse based on the calculated impulse and sensitivity for each impulse indicated by the user data.

5. The vehicle control system of claim 4, wherein the controller is configured to:
   set a reference speed according to a current driving state of the vehicle based on the set target speed and a distance between the vehicle and the found uneven road surface.

6. The vehicle control system of claim 5, further comprising:
   at least one of a display device, a sound output device, or a vibration output device,
   wherein the controller is configured to output a user interface (UI) indicating at least one of the target speed, the reference speed, or the distance between the vehicle and the found uneven road surface, by using at least one of the display device, the sound output device, or the vibration output device.

7. The vehicle control system of claim 1, wherein the controller is configured to:

detect that the vehicle passes the uneven road surface; and
store the impulse data.

8. The vehicle control system of claim 1, wherein the controller is configured to:
obtain a first weight according to a user; and
calculate the target speed by applying the obtained first weight to machine learning.

9. The vehicle control system of claim 1, wherein the controller is configured to:
obtain at least one of a driving road environment, an uneven surrounding environment, driving purpose information, or passenger information;
calculate a second weight based on the obtained at least one information; and
calculate the target speed by applying the second weight.

10. The vehicle control system of claim 1, further comprising:
at least one of a display device, a sound output device, or a vibration output device,
wherein the controller is configured to output a user interface (UI) indicating at least one of the target speed, a reference speed, or a distance between the vehicle and the found uneven road surface, by using at least one of the display device, the sound output device, or the vibration output device.

11. The vehicle control system of claim 1, further comprising:
a navigation configured to set the driving route; and
a positioning system configured to measure the location of the vehicle.

12. The vehicle control system of claim 1, further comprising:
at least one sensor configured to generate the shape information about the found uneven road surface.

13. The vehicle control system of claim 1, further comprising:
a communication circuit configured to communicate with a data server,
wherein the controller is configured to:
receive at least one of map information, the vehicle information, uneven road surface information, or the user data from the data server by using the communication circuit.

14. A method of a vehicle control system, the method comprising:
obtaining route information based on a driving route and a location of a vehicle;
searching for an uneven road surface on the driving route based on the route information;
calculating an impulse based on vehicle information and shape information about the found uneven road surface when the uneven road surface is found;
setting a target speed based on the calculated impulse and user data;
controlling a speed of the vehicle based on the target speed;
obtaining user feedback data by obtaining biometric data of a passenger or a face recognition result of the passenger at a point in time when the vehicle passes the uneven road surface or receiving a response of the passenger to a survey corresponding to data for the uneven road surface; and
updating the user data based on the user feedback data corresponding to impulse data for the uneven road surface.

15. The method of claim 14, wherein the searching for the uneven road surface includes:
calculating a search distance based on a maximum driving speed of the vehicle, a speed at a point in time when the vehicle passes the uneven road surface, and a margin distance; and
searching for the uneven road surface based on whether the uneven road surface is present within the search distance.

* * * * *